United States Patent

[11] 3,598,318

| [72] | Inventor | Theodor J. Schiel<br>Cornelius, Oreg. |
|---|---|---|
| [21] | Appl. No. | 27,274 |
| [22] | Filed | Apr. 10, 1970 |
| [45] | Patented | Aug. 10, 1971 |
| [73] | Assignee | The Boeing Company<br>Seattle, Wash. |

[54] MOVABLE ACOUSTIC SPLITTER FOR NOZZLE AREA CONTROL AND THRUST REVERSAL
9 Claims, 6 Drawing Figs.

[52] U.S. Cl. .................................................. 239/265.13,
239/265.19, 239/265.29, 239/265.33
[51] Int. Cl. ........................................................... B64d 33/04
[50] Field of Search .................................................. 239/265.13,
265.19, 265.23, 265.29, 265.31, 265.25, 265.27

[56] References Cited
UNITED STATES PATENTS

| 3,352,494 | 11/1967 | Colville et al. | 239/265.13 |
| 3,543,877 | 12/1970 | Ranuier et al. | 239/265.13 |

*Primary Examiner*—Lloyd L. King
*Attorneys*—Glenn Orlob and Bernard A. Donahue

ABSTRACT: An aircraft engine nozzle foil means comprising a plurality of segmented foil members which are movable from a cruise or stowed position along a wall of the nozzle duct at the exit plane to a first position well forward of the exit plane within the duct to split the flow of acoustic attenuation and to increase the nozzle passageway exit plane area for low speed flight. The foil members are movable to a second operative position wherein they block the nozzle flow to divert exhaust gases through a lateral passageway through the outer cowl which is opened by a translating aft portion of the cowl.

INVENTOR.
THEODOR J. SCHIEL
BY
Bernard A. Donahue
ATTORNEY

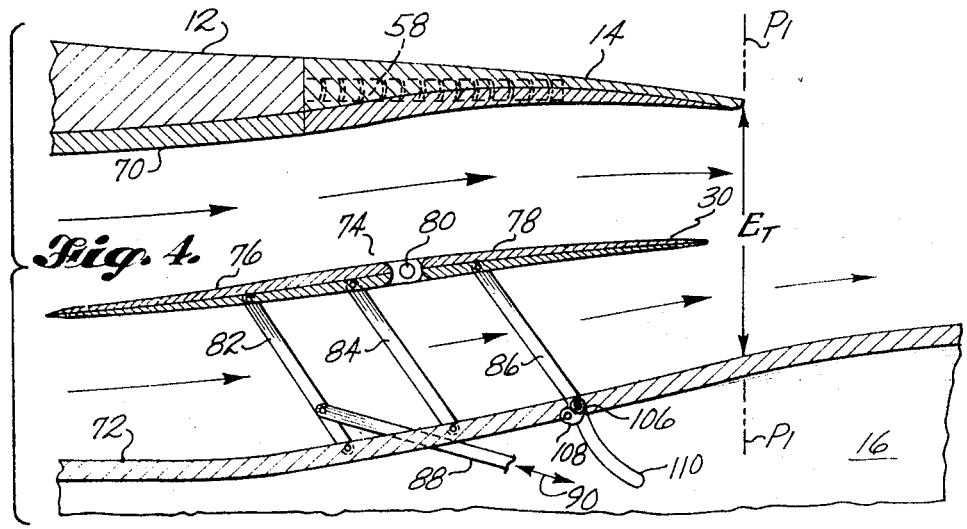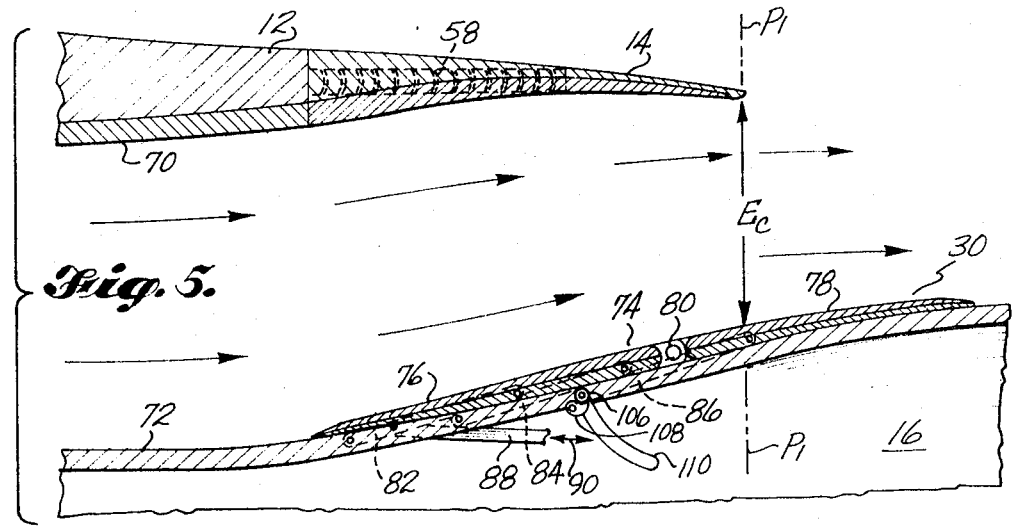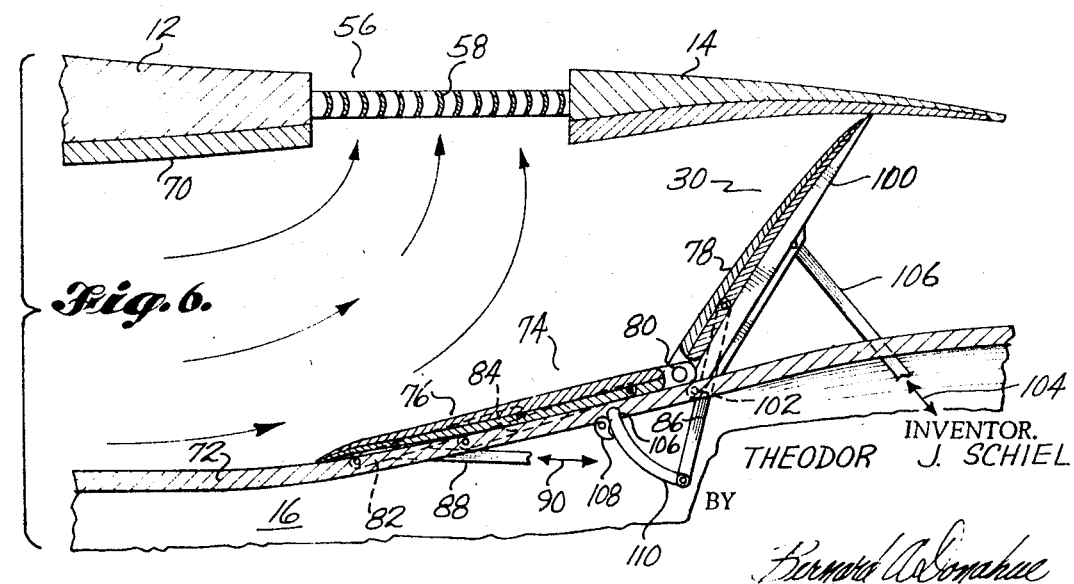

MOVABLE ACOUSTIC SPLITTER FOR NOZZLE AREA CONTROL AND THRUST REVERSAL

This invention relates to an aircraft engine exhaust nozzle system, and more particularly to a mechanism for selectively controlling nozzle flow which is selectively movable into a first position for increasing nozzle exit plane area and attenuating sound during low speed flight, and into a second position for thrust spoiling or reversal.

Nozzle designs for subsonic aircraft jet engines currently in use often exhibit one or more of the following problems:
1. a nozzle area which is too small for optimum propulsive efficiency, at takeoff because of cruise flight restrictions;
2. a noise level which is too high for present or proposed governmental regulations; and
3. complex thrust reverser structure which interferes with nozzle flow patterns and/or with access for routine maintenance purposes.

The general problem of a variable nozzle area has been approached and solved in the prior art by relatively complex mechanisms for transonic regime adjustment of supersonic flight.

Noise level problems have been approached and to some extent solved by relatively heavy and inefficient noise suppression systems such as tubular arrays and/or by lining the nozzle wetted area with acoustical materials.

A multitude of systems have been devised for thrust spoiling or reversal, some in combination with independent or coacting sound suppression systems. Most of these have involved extraneous reverser elements which either interfere with cruise flow patterns or with access through the exhaust passageway for routine maintenance.

It is an object of this invention to provide a simple unitary system for selective control of nozzle flow to increase nozzle-propulsive efficiency at takeoff, to improve sound attenuation and to simplify the mechanism involved in thrust spoiling or reversal.

A related object of this invention is to provide a mechanism for selectively varying nozzle exit area for maximum area at takeoff with a reduced exit area for cruise flight, consistent with optimum propulsive efficiency in each mode of operation.

A related object of this invention is the improved attenuation of emitted engine sound pressure levels by increasing the acoustically treated area wetted by the exhaust stream during low speed flight.

A further related objective of this invention is to simplify the mechanism involved in thrust spoiling or reversal over many previous designs by eliminating linkages which interfere with clean aerodynamic flow through the nozzle and restrict access for routine maintenance purposes.

The above objectives are each achieved in the preferred embodiment of this invention by a plurality of longitudinally aligned foil means having acoustic surfaces which form portions of the wall of the exhaust passageway extending to the nozzle exit plane in a stowed or cruise position, and which are moved to a first or low speed flight position located well forward of the exit plane near duct midheight. When moved to said first position, an increase in exit plane area is inherent and the foil member splits the flow thereby increasing the wetted area which is acoustically treated. A second or reverse thrust position is achieved by pivoting an aft portion of said foil means into a position blocking the flow through the passageway while an aft portion of the engine cowling translates aft to expose a lateral passageway for thrust spoiling or reversal.

FIG. 4 is an expanded detail showing of one of applicant's foil means positioned for low speed flight.

FIG. 5 is a view similar to FIG. 4 with the foil means in the stowed or cruise flight position.

FIG. 6 is a view similar to FIG. 4 with the foil means shown in a reverse thrust position.

Figure 1:
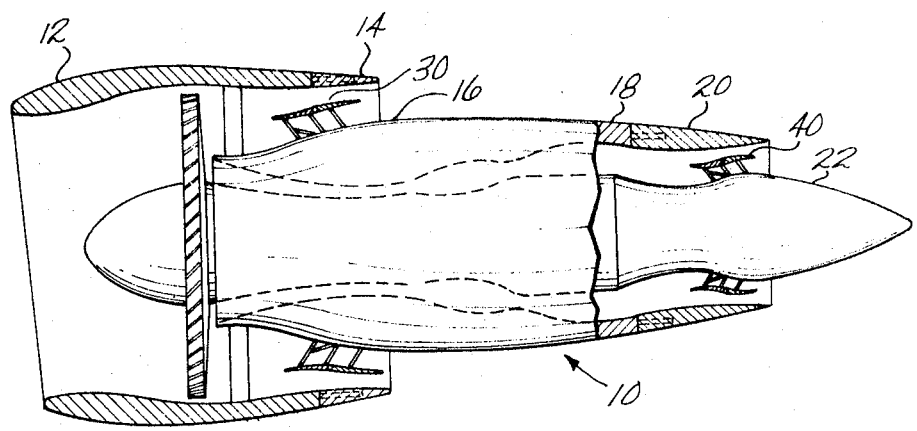
FIG. 1 is an elevation view of an aircraft engine and nacelle structure equipped with applicant's foil means which are shown in the low speed or takeoff position.

Referring now to FIG. 1, a high-bypass ratio turbofan engine 10 is shown to include a forward fan cowling 12, a translating fan cowl portion 14, an engine fan centerbody portion 16, a primary exhaust cowl 18, a translating primary cowl portion 20, and a primary exhaust centerbody 22. Applicant's foil means 30 and 40 are shown positioned at duct midheight in the fan nozzle and in the primary exhaust nozzle, in the takeoff or low speed flight position. As will later be apparent, the FIG. 1 positions provide for maximum areas at the nozzle exit planes located at the aft ends of the cowl portions 14 and 20. The foil means 30 and 40 will be understood to be necessarily segmented when adapted for use with a circular or annular nozzle configuration as shown. The foil means therefore involve a plurality of circumferentially spaced foil members 30 and 40 which collectively form a ringlike array.

Foil means 30 and 40 in the FIG. 1 position effectively split the flow into an inner and outer annular pattern nd increase the effective area which is wetted by the exhaust gases (compared to a conventional nozzle) thereby allowing more area to be available for acoustic treatment and consequent sound attenuation.

Figure 2:
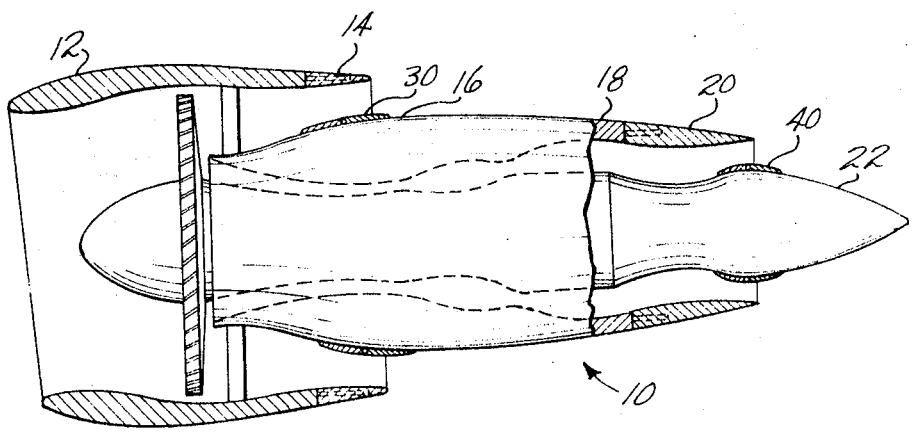
FIG. 2 is an elevation view similar to FIG. 1 showing Applicant's foil means in the cruise flight position.

FIG. 2 displays the foil means 30 and 40 in the cruise flight or stowed positions, at rest against centerbody structures 16 and 22. The exit plane areas at the aft end of each nozzle can be seen to have been decreased over the low speed flight position of FIG. 1 by virtue of the physical volume of the foil means now present at the nozzle exit plane. As discussed previously this decrease in exit area is desirable from a propulsive efficiency standpoint.

Figure 3:
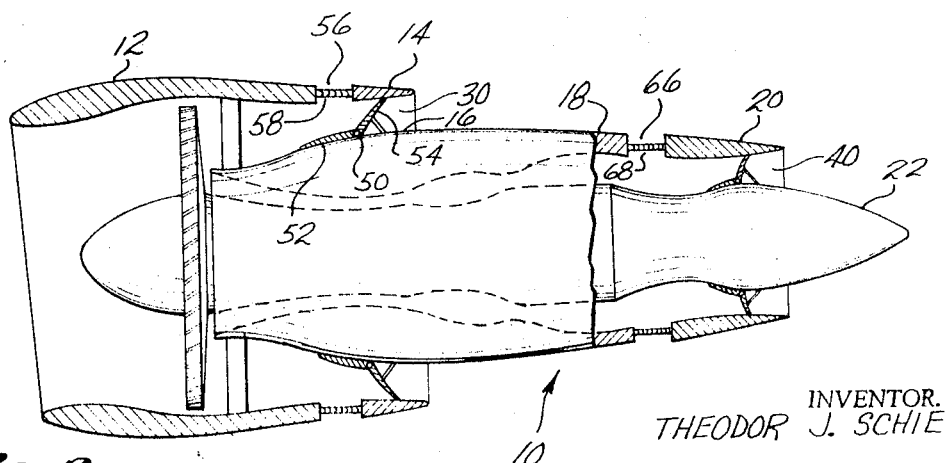
FIG. 3 is an elevation view similar to FIG. 1 showing Applicant's system positioned for reverse thrust.

FIG. 3 shows the foil means 30 and 40 disposed for thrust reverser operation. As will later become more apparent in connection with the discussion of the detailed sectional views of FIGS. 4 through 6, the foil means are pivotally articulated by means such as pin 50 into a forward section 52 and an aft section 54, such that aft section 54 can be moved in the manner of a blocker door to substantially block flow longitudinally through the nozzle passageway. From FIG. 3 it can be seen that when normal flow through the nozzle is blocked by aft section 54 that the outer cowling aft portion 14 has been translated aft to uncover a lateral passageway 56 which is equipped with turning vanes 58 to turn the lateral flow forwardly for thrust reversal. Also, it is apparent that the foil means 40 in the primary exhaust passageway function in a similar manner for spoiler action or thrust reversal by cooperating with aft cowl 20 to direct flow laterally and forwardly through lateral passage 66 and turning vanes 68.

Turning now to FIG. 4, there is shown a detailed cross section of foil means 30 in the fan nozzle passageway. The forward sleeve or forward fan cowl 12, and aft sleeve or aft fan cowling 14 are provided with acoustically treated surfaces 70 which form the outer wall of the nozzle passageway. The centerbody 16 likewise has an acoustically treated surface 72. The basic nozzle formed by these surfaces is of a conventional annular convergent type for a fan jet engine. The foil means 30 includes a very thin foil member 74 which is divided into a forward section 76 and an aft section 78 by a pivotal joint 80, and linkages 82, 84, 86 and 88 with an actuating means schematically depicted by a force symbol 90.

All exterior surfaces of both sections 76 and 78 are aerodynamically shaped and are treated acoustically; e.g., with Feltmetal or another of the commonly used acoustic surface materials. Since the foil means 30 will form a segmented ringlike array with only small gaps between the members 74, it is apparent that the wetted surface area available for acoustic attenuation of sound pressure levels has been increased markedly over a conventional nozzle. The foils means 30 effectively split or divide the flow pattern into outer and inner annular portions separated by foil members 74.

FIG. 4 further defines a nozzle exit plane $P_1$ arranged perpendicular to the longitudinal centerline of the engine and passing through the aft tip of aft fan cowling 14. It is noted that in the takeoff or low speed flight position shown, the foil means 30 is located well forward of nozzle exit plane $P_1$. Therefore, the nozzle annular area along $P_1$ can be sized for theoretical optimum takeoff performance. Because of the converging nature of the nozzle, the foil member 74, when positioned and shaped as shown, should not create an overriding or controlling minimum area upstream of the exit plane. However, the member 74 should be located, sized and shaped for the particular installation involved to assure the proper effective nozzle areas for propulsive efficiency at takeoff.

FIG. 5 shows the foil means 30 in a stowed or cruise flight position. Note that the members 74 of foil means 30 are at rest against the engine centerbody 16 with the forward section 76 and aft section 78 assuming angular positions about pivotal joint 80 which are best suited for conforming to the centerbody shape. It will readily be recognized that the linkage mechanism 82, 84, 86, and 88 can be designed and adjusted to give any desired angular relationship of the forward section 76 with respect to the aft section 78 about pivotal joint 80, in both the takeoff position of FIG. 4 and the stowed position of FIG. 5. The optimum shape for takeoff will normally resemble a duct center streamline, while the stowed position shape will be dictated by the centerbody exterior shape.

It must be further noted that in the FIG. 5 cruise flight position, the aft section 78 extends through the nozzle exit plane $P_1$. As mentioned previously, applicant's foil means 30 comprises a plurality of segmented flap members which nest in a ringlike array around the centerbody. Therefore, the effective nozzle exit area at plane $P_1$ for cruise flight will be the annular area dimensioned by $E_c$ in FIG. 5, which is smaller than the similar dimension $E_t$ of FIG. 4 by the effective thickness of the aft section 78 of foil member 74. For a typical engine configuration under study, it was determined that area changes, from takeoff to cruise, of 8 percent were readily achieved with applicant's system; this area change being sufficient to increase takeoff thrust by approximately 2 percent over the existing design.

FIG. 6 shows applicaant's foil means 30 and aft cowl portion 14 positioned for the reverse thrust mode of operation. The forward section 76 of foil member 74 can be seen to be held in a position similar to the cruise flight position against centerbody 16 while aft section 78 has been rotated about pivot joint 80 counterclockwise as shown into a position substantially blocking longitudinal flow through the nozzle passageway. The aft cowl portion 14 has been translated aft to open lateral passageway 56 to expose turning vanes 58 which redirect the lateral flow in a forward direction. The aft sections 78 of foil members 74 are each forcibly rotated about pivot joint 80 into blocking position by reverser gap pads 100. The gap pads 100 preferably comprise relatively small members which contact the foil members only in the immediate area near their adjacent spaced edges, and which are nested into small recesses in the centerbody when the foil means 30 is disposed in either the first position shown in FIG 4 or the stowed position of FIG. 5. The gap pads 100 serve to block the gaps between foil members 74 in the reverser mode shown in FIG. 6 and are rotated about point 102 by power actuation means (schematically depicted by force lines 104), located in the centerbody 16 and acting through linkage means 106.

It will be understood that in the embodiment shown, the linkage 86 serves a dual function of pivotally supporting the aft portion 78 about pivot point and detent 106 in the first and stowed positions, and in acting as a hold down link (or optionally as an idler link) in the reverser mode of FIG. 6. Accordingly, a conventional detent holding device such as trigger 108 is provided to selectively either hold the linkage 86 in detent 106 or allow it to move along cam track 110 for reverser actuation.

Based on the foregoing description it is apparent that applicant's system provides a simple lightweight means for adjusting nozzle area for propulsive efficiency, for markedly increasing nozzle wetted area which can be used for sound attenuation, and for simplifying thrust reverser design and eliminating extraneous elements interfering with nozzle flow and/or access for maintenance purposes. Many variations of the preferred embodiment shown will be apparent to persons skilled in this art. The concepts disclosed are applicable to most current aircraft engines with modifications that do not depart from the spirit and scope of the invention. Therefore, it is intended in the appended claims to cover all such variations and modifications.

What I claim and desire to secure by Letters Patent is:

1. In an aircraft jet engine having a longitudinally oriented exhaust nozzle passageway wall structure defined by the engine centerbody and an engine outer cowling, a mechanism for selectively controlling the flow of gases passing therethrough, said mechanism comprising:

a plurality of aerodynamically shaped thin foil members having oppositely facing longitudinally extending exterior surfaces which are acoustically treated;

means for holding said member in a stowed position along said wall to thereby prevent flow of said gases over at least one of said oppositely facing surfaces;

means for moving said foil members from said stowed position to first operative position located such that flow of said air is split into an outer portion flowing between said foil members and said wall, and an inner portion physically separated from said outer position by said foil members;

wherein by movement of said foil members from said stowed position to said first operative position the wetted area of acoustically treated surface over which said gases will flow is increased to thereby increase the attenuation of sound pressure levels in said exhaust nozzle passageway.

2. The mechanism of claim 1 wherein said foil members in said stowed position form a substantial portion of the total surface area along said wall of said passageway and extend to the nozzle exit plane as defined by the aft limit of said engine outer cowling, and wherein said foil members are translated to a position forward of said nozzle exit plane upon movement into said first operative position to thereby increase the effective area of said passageway at said nozzle exit plane.

3. The mechanism of claim 1 wherein said plurality of foil members each include a forward section and an aft section which are pivotally interconnected for relative angular motion with respect to each other.

4. The mechanism of claim 1 wherein each of said foil members is movable to a second operative position substantially blocking flow longitudinally through said nozzle passageway.

5. The mechanism of claim 4 wherein in said stowed position said foil members are aligned against an inner wall of said passageway defined by said engine centerbody and said means for moving includes actuator means attached to said engine centerbody for movement of said foil means into either said stowed position, said first operative position, or said second operative position, 6. The mechanism of claim 5 wherein said engine outer cowling comprises a fixed forward cowling section and a movable aft cowling section which translates longitudinally to open a lateral passageway through said cowling when said foil members are disposed in said second operative position.

7. The mechanism of claim 6 wherein said lateral passageway is provided with means for directing said flow pattern of gases in a forward direction for thrust reversal.

8. In an aircraft fan jet engine having a longitudinally oriented annular fan nozzle exhaust passageway formed between engine centerbody structure and outer cowling structure with a nozzle exit plane at the left end of said outer cowling structure, a mechanism for selectively controlling the flow pattern of gases discharged from said fan, said mechanism comprising:

a plurality of longitudinally aligned foil members, means for moving said foil members from a stowed position extending to said exit plane along a wall of said passageway to a first operative position wherein said foil members are displaced forwardly, away from said exit plane and into said annular passageway to split said flow into two distinct portions and to effectively increase the passageway area at said exit plane, said foil members being movable from either said stowed or said first position to a second position wherein said foil means substantially blocks flow longitudinally through said annular nozzle passageway, wherein said outer cowling structure includes a fixed forward cowling section and a movable aft cowling section which translates longitudinally to open a lateral passageway through said cowling when said foil means is disposed in said second operative position.

9. The mechanism of claim 8 wherein said lateral passageway is provided with means for directing said flow pattern of gases in a forward direction for thrust reversal.